United States Patent [19]
Fasano

[11] 4,227,603
[45] Oct. 14, 1980

[54] DEVICE FOR AUTOMATIC COMPENSATION OF WEAR IN FRICTION DRIVE CLUTCHES OF MOTOR VEHICLES

[75] Inventor: Osvaldo Fasano, Villarbasse, Italy
[73] Assignee: Start S.p.A. Studi Apparecchiature E Ricerche Tecniche, Turin, Italy
[21] Appl. No.: 961,072
[22] Filed: Nov. 15, 1978
[51] Int. Cl.² ............................................. F16D 13/75
[52] U.S. Cl. ................................... 192/111 A; 74/512; 188/196 BA
[58] Field of Search ............. 192/111 A, 70.25, 70.29, 192/70.3; 74/512, 539; 188/79.5 R, 79.5 GC, 79.5 K, 71.8, 196 R, 196 BA

[56] References Cited
U.S. PATENT DOCUMENTS

| 3,199,640 | 8/1965 | Thompson | 188/196 BA |
| 3,625,087 | 12/1971 | Flory et al. | 74/512 X |
| 3,789,967 | 2/1974 | Dau et al. | 192/111 A |
| 3,926,284 | 12/1975 | Notario | 188/196 BA |
| 3,974,713 | 8/1976 | Toohey | 74/512 |

Primary Examiner—C. J. Husar
Assistant Examiner—Moshe I. Cohen
Attorney, Agent, or Firm—Sughrue, Rothwell, Mion, Zinn and Macpeak

[57] ABSTRACT

A device for automatically compensating for wear in a friction clutch of the kind which is released by a pedal-operated control lever acting on a cable through an intermediate element articulated to the control lever, has a toothed sector on the intermediate element which meshes with a pinion carried by structure which is pivoted on the intermediate element about the axis of the toothed sector. When the control lever is depressed to disengage the clutch the pinion is engaged by a stop surface which prevents rotation of the pinion, so that the intermediate member moves with the control lever; when the control lever returns to its rest position, however, the stop surface disengages from the pinion, allowing the latter to rotate, so that the intermediate member can assume a new position relative to the control lever, thereby taking up wear in the clutch.

7 Claims, 10 Drawing Figures

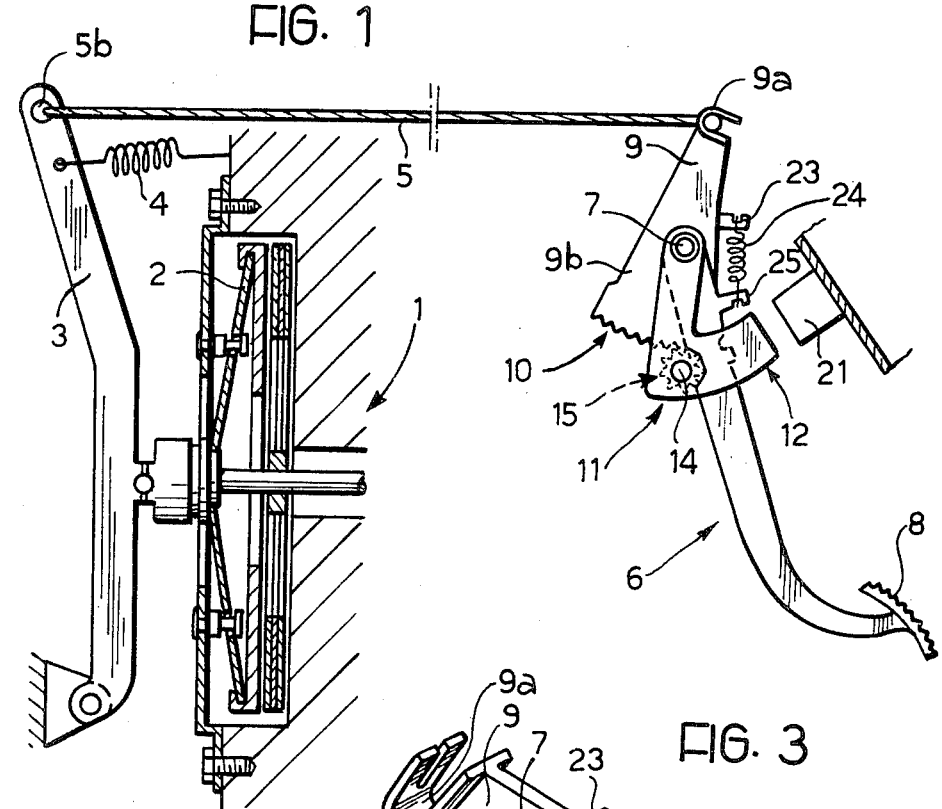
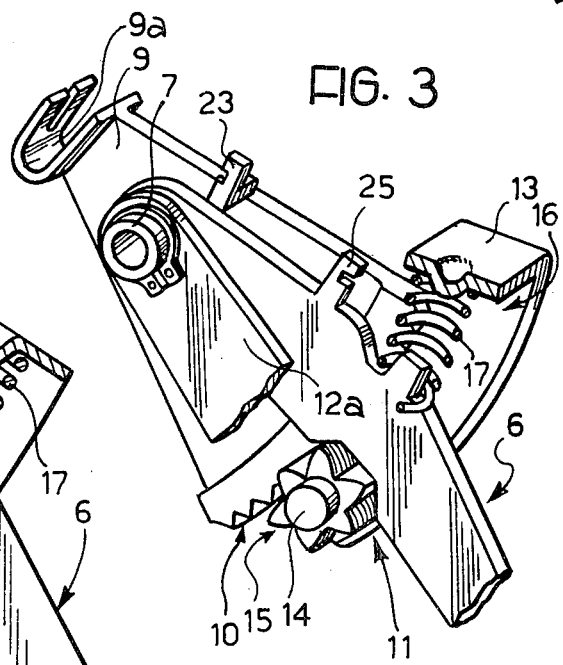
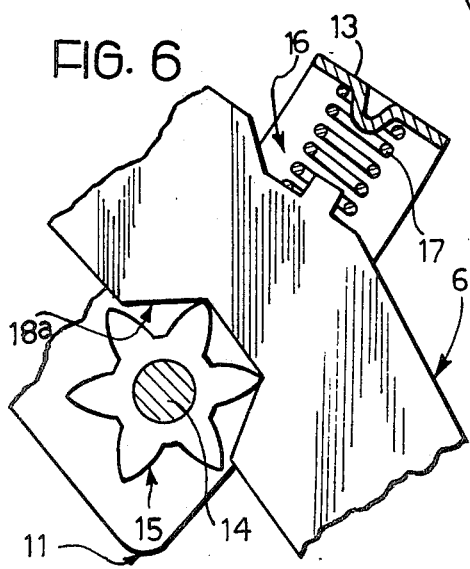

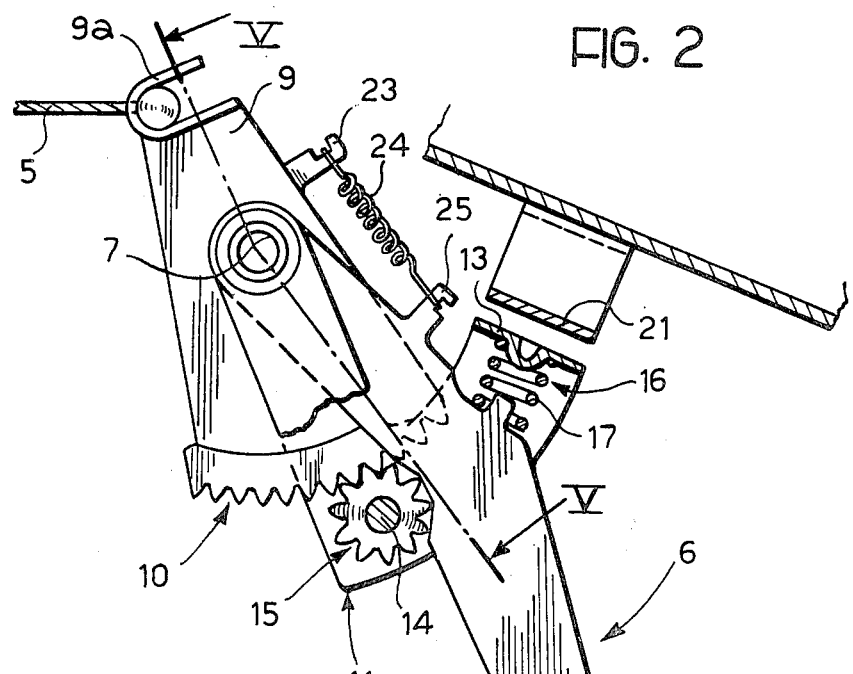
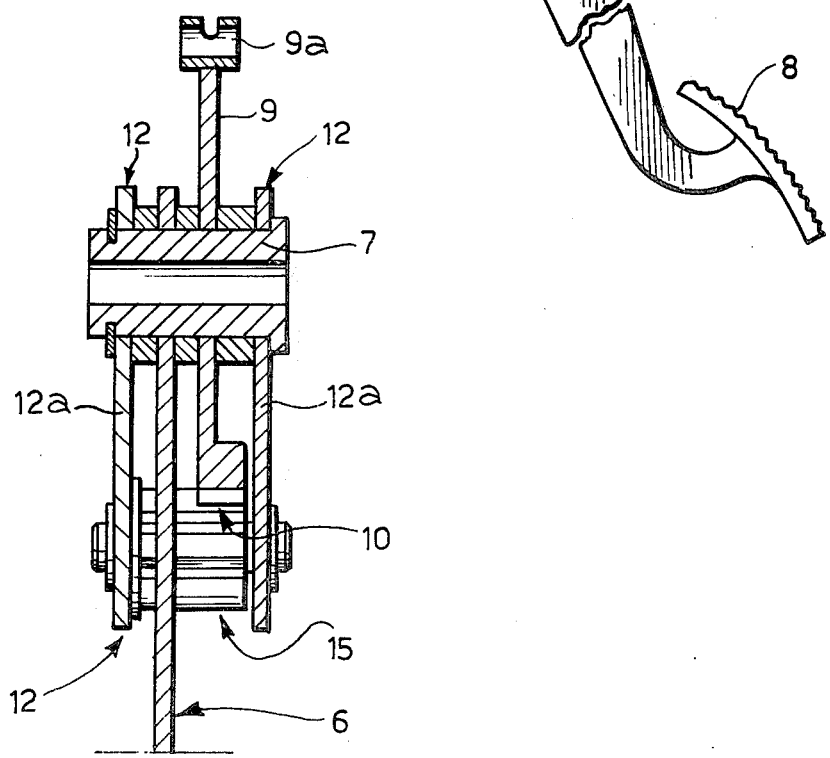

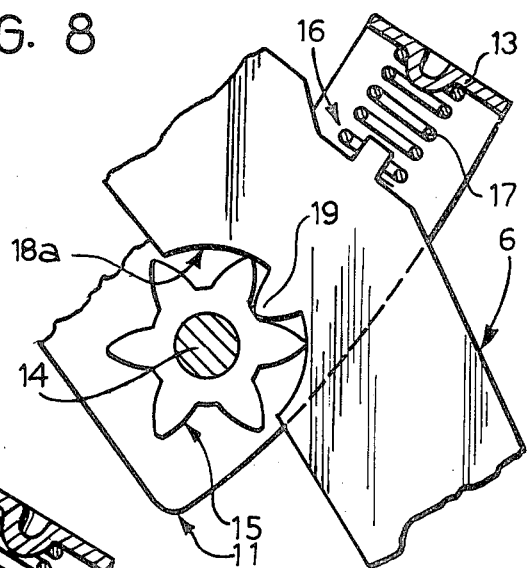
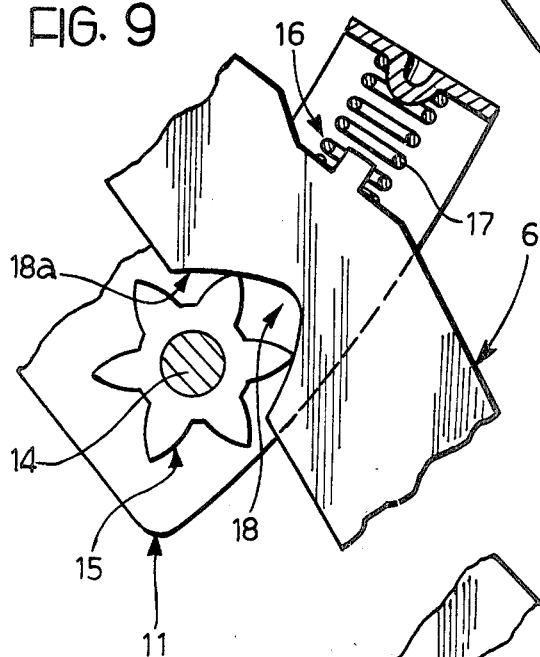
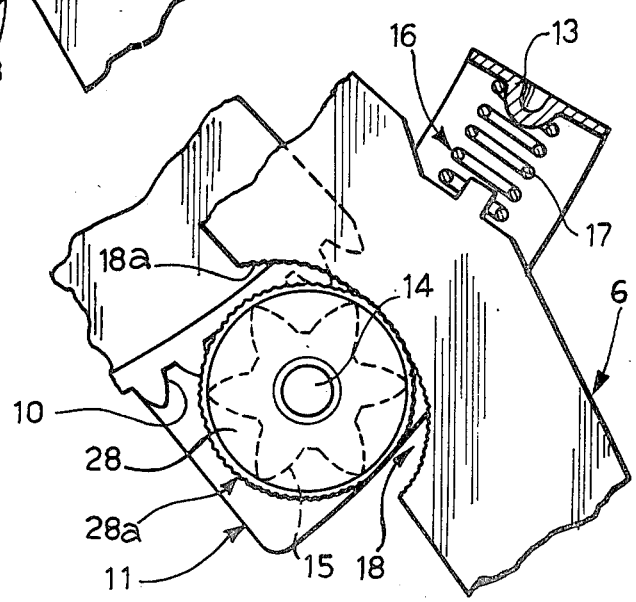

4,227,603

DEVICE FOR AUTOMATIC COMPENSATION OF WEAR IN FRICTION DRIVE CLUTCHES OF MOTOR VEHICLES

This invention relates to devices for the automatic compensation of wear in friction clutches of motor vehicles.

The invention relates more particularly to devices of the type comprising a driver-operated control lever for disengaging a friction clutch, an intermediate element pivoted on the control lever and connected to a clutch-release cable, means for interlocking the control lever and the intermediate element so as to prevent their relative rotation, and disengagement means which, in opposition to the interlocking means, disengage the intermediate element from the control lever when the latter is in its rest position.

The object of the invention is the provision of a friction clutch of the specified type, of simple and robust construction, which is reliable in operation.

With a view to achieving this object the present invention provides a device for the automatic compensation of wear in friction clutches of motor vehicles of the type referred to above characterised in that the interlocking means comprise a toothed circular sector formed on the intermediate element, a support structure pivoted on the intermediate element about an axis which coincides with the axis of the toothed sector, a pinion rotatably mounted on the support structure and having teeth adapted to mesh with the corresponding teeth of the toothed sector, stop means carried by the control lever for engagement with the pinion to prevent rotation thereof during clutch-operating movement of said lever, resilient engagement means urging the stop means into engagement with the pinion, resilient biasing means acting upon the control lever in opposition to said resilient engagement means to return the control lever to its rest position, said biasing means cooperating with means for limiting the return movement of the pinion support structure so as to effect disengagement of said pinion from the stop means upon return of the control lever to its rest position.

The invention will be further described, by way of example, with reference to the accompanying drawings, in which:

FIG. 1 is a diagrammatic side view, partly in section, of a friction clutch for motor vehicles, equipped with a device in accordance with one embodiment of the invention;

FIG. 2 is a side view of a detail of FIG. 1, on an enlarged scale;

FIG. 3 is a partial perspective view of components of the device shown in FIG. 1;

FIG. 5 is a cross sectional view taken on line V—V in FIG. 2;

FIG. 6 is a side view of a detail of FIG. 2 on an enlarged scale, and

FIGS. 7, 8, 9 and 10 are side views corresponding to FIG. 6 illustrating variants of the invention.

Figure 4:
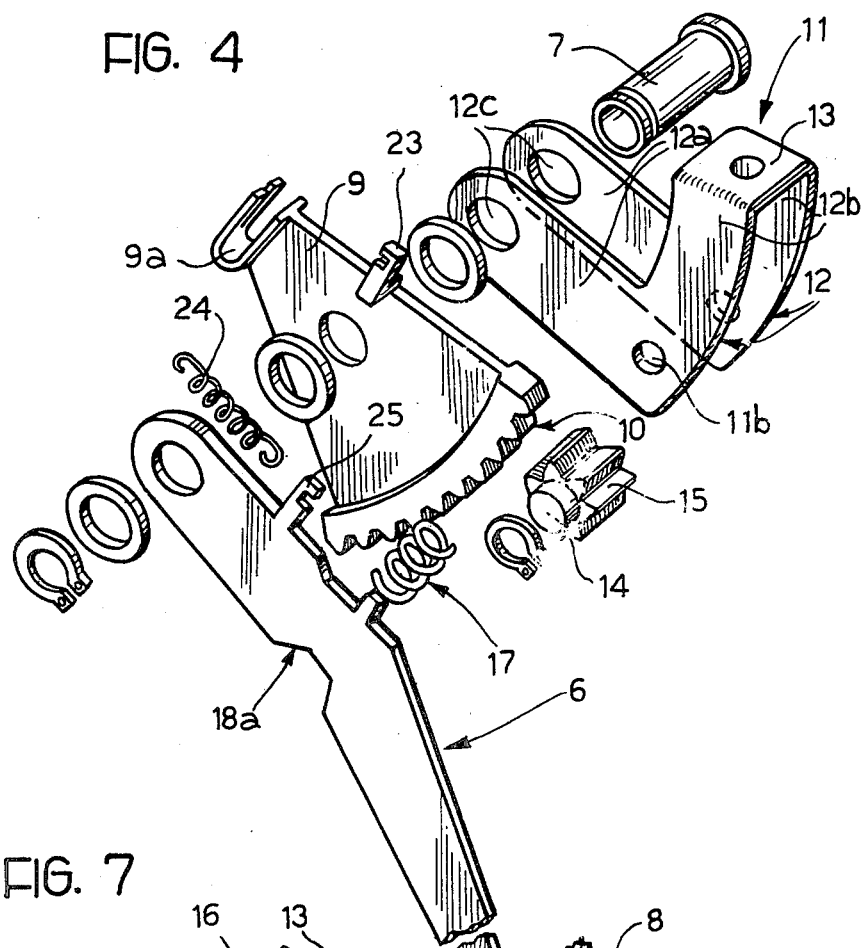
FIG. 4 is an exploded perspective view of the components shown in FIG. 2.

Reference numeral 1 indicates a friction clutch for a motor vehicle. The friction clutch 1 is maintained in an engaged position by a conical disc spring 2. A clutch release lever 3, as known per se, is pivoted at one end to a fixed part of the vehicle and intermediate its ends it bears against the apex of the conical disc spring 2, being kept in contact with the latter by a tension spring 4 attached to the end of the lever 3 opposite its pivoted end. The release lever 3 is movable against the action of the spring 2 by means of a cable 5 when the driver operates a control lever 6.

One end of the control lever 6 is pivoted about a pin 7 which is secured to a fixed part of the motor vehicle, not shown. The control lever 6 carries a clutch pedal 8 at its free end against which the driver exerts the necessary pressure to release the clutch. The pivot pin 7 also provides pivotal support for an elongate intermediate element 9 one end 9a of which is anchored to the cable 5 while the opposite end 9b forms a toothed segment 10 which is concentric with the axis of the pin 7 on which the element 9 is pivoted.

A pinion support structure 11 is pivotally connected to the element 9. The support structure 11 comprises two L-shaped plates 12 arranged on opposite sides of the element 9. The plates 12 have straight radial arms 12a which have through holes 12c at their free ends in which opposite ends of the pivot pin 7 are located. Respective arcuate arms 12b of the plates 12 adjoin the radial arms 12a and are interconnected at their free ends by an integral bridge portion 13, so that the support structure 11 embraces the intermediate element 9 and the control lever 6.

The two plates 12 have aligned holes 11b at their elbow portions where the arms 12a and 12b meet each other. A shaft 14 is located between the plates 12, its opposite ends being rotatable in the holes 11b. A pinion 15 is fixed to the shaft 14 between the two plates 12, the control lever 6 being interposed between the pinion 15 and the bridge portion 13. The clearance between the pinion 15 and the bridge portion 13 is such that when one edge of the lever 6 is in contact with the pinion 15 the opposite edge of the lever 6 is spaced from the bridge portion 13 by an end portion 16. Within the free space defined by the end portion 16 a compression spring 17 is lodged, one end of the spring 17 bearing against the bridge portion 13, and the other end against the adjoining edge of the control lever 6.

The edge of the control lever 6 which contacts the pinion 15 has a recess 18 which is deep enough to receive the said pinion. The edge 18a defining the recess 18 has a part-polygonal shape, and the action of the spring 17 is such as to urge the control lever 6 against the pinion 15 so as to bring some of the teeth of the latter into engagement with the shaped edge of the polygonal recess 18. The effect of this engagement is to prevent rotation of the pinion 15. A fixed stop 21 is arranged in a position adjacent the bridge portion 13, and is attached to a fixed part of the motor vehicle.

The intermediate element 9 is provided with a lug 23 to which one end of a tension spring 24 is attached the other end of the spring 24 being attached to a lug 25 on the control lever 6. The tension of the spring 24 biasses the lever 6 in the opposite direction to that in which the lever is rotated when the pedal 8 is depressed by the driver. In the absence of any force on the pedal 8 the action of the spring 24 on the lever 6 brings the bridge portion 13 into abutment with the stop 21. The spring 24 is sufficiently strong to overcome the opposing action of the spring 17 on the control lever 6 so that, when the bridge portion 13 contacts the stop 21, the support structure 11 is arrested, while the lever 6 rotates further under the influence of the spring 24, compressing the spring 17. The action of the spring 24 is therefore such as to disengage the control lever 6 from the pinion 15, which is thus left free to rotate about its own axis in the absence of an operating force on the pedal 8.

The operation of the device is as follows.

When the driver depresses the pedal 8 the control lever 6 is pivoted in opposition to the spring 24 from its position of rest. As the result of this movement of the control lever 6 the polygonal edge 18a of the recess 18 is brought into engagement with the pinion 15, adjacent vertices of the polygonal edge 18a being engaged by adjacent teeth of the pinion 15 to prevent rotation of the latter (FIG. 6). Continued pivotal movement of the control lever 6 takes with it the pinion 15 and the pinion support structure 11. Since the pinion 15 is prevented from rotating by engagement with the polygonal edge 18a, the intermediate element 9 is also moved with the control lever 6 about the pivot pin 7, disengaging the clutch through the medium of the cable 5 and the release lever 3.

As the friction clutch wears in use the free end of the release lever 3 changes its initial position and moves progressively away from the control lever 6. It is necessary to compensate this movement in order to avoid a corresponding rearward displacement of the clutch pedal 8. Such compensation is effected automatically when the force on the pedal 8 is released and the control lever 6 returns to its rest position.

Upon return of the control lever to its rest position the pinion 15 is disengaged from the polygonal edge 18a and is free to rotate. The intermediate element 9 is therefore able to rotate about the pivot pin 7 in an anticlockwise sense as viewed in FIG. 2 to compensate for the displacement of the lever 3 due to wear of the friction surfaces of the clutch, while leaving the control lever 6 in its rest position.

Figure 7:
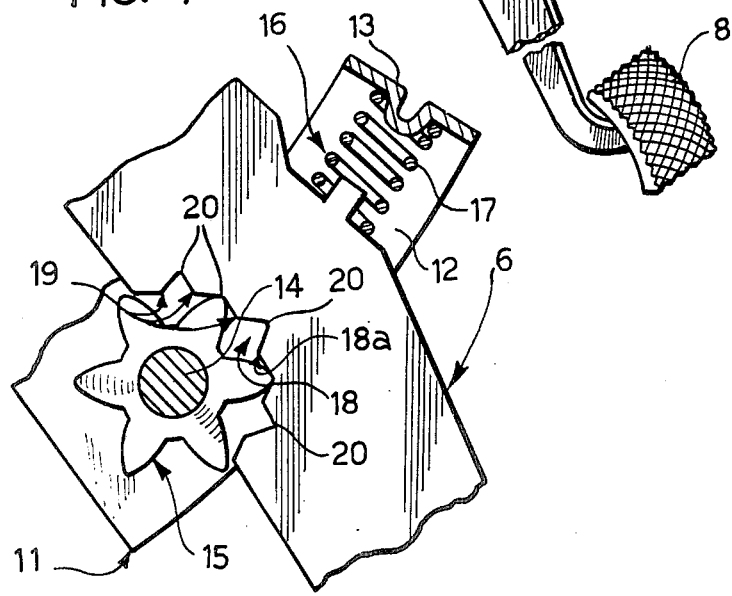

In the variant shown in FIG. 7 the edge 18a defining the recess 18 is formed with a plurality of teeth 19 triangular in profile separated from one another by indentations 20 in which adjacent teeth of the pinion 15 may engage.

FIG. 8 shows another variant in which the edge 18a of the recess 18 is formed with a single tooth 19 so shaped as to engage between the adjacent teeth of the pinion 15.

The variant shown in FIG. 9, on the other hand, has a recess 18 the edge 18a of which has no projections, but has a substantially parabolic or V-shaped profile which is such as to engage the teeth of the pinion 15 and prevent rotation thereof. By making the V-shaped recess 18 suitably narrow it can be arranged than when the pinion 15 enters the recess 18 its teeth are wedged against the edge 18a of the recess.

FIG. 10 shows a further variant in which the edge 18a of the recess 18 formed in the control lever 6 is knurled or roughened so as to constitute a friction surface for engagement with a corresponding friction surface 28a on the periphery of an auxiliary wheel 28 adjoining the pinion 15 and coaxial therewith, the wheel 28 having an external diameter which is somewhat greater than that of the pinion 15. The frictional force needed to slide the friction surface 28a and the edge 18a over one another diminishes as the external diameter of the auxiliary wheel 28 increases, whereas the frictional force increases as the diameter of the pinion 15 increases.

It will be understood that practical embodiments of the invention may be widely varied relative to what has been described and illustrated, without departing from the scope of the present invention.

I claim:

1. Device for automatically compensating for wear in a friction clutch of a motor vehicle, comprising a driver-operable control lever for effecting clutch disengagement, said control lever having a rest position, an intermediate element articulated to the control lever, clutch release mechanism, an operating cable having one end attached to the control lever and its other end connected to the release mechanism, means for interlocking the control lever and the intermediate element to prevent their relative rotation, and disengagement means for counteracting the interlocking means to disengage the intermediate element from the control lever when the latter is in its rest position, wherein the improvements consist in the interlocking means comprising:

a toothed circular sector formed on the intermediate element, a support structure pivoted on the intermediate element about an axis which coincides with the axis of the toothed sector, a pinion rotatably mounted on the support structure and having teeth adapted to mesh with the corresponding teeth of the toothed sector, stop means carried by the control lever for engagement with the pinion to prevent rotation thereof during clutch-operating movement of said lever, resilient engagement means urging the stop means into engagement with the pinion, resilient biasing means acting upon the control lever in opposition to said resilient engagement means to return the control lever to its said rest position, and means cooperating with said biasing means for limiting the return movement of the pinion support structure, to effect disengagement of said pinion from the stop means upon return of the control lever to said rest position.

2. The device defined in claim 1, wherein the stop means carried by the control lever comprise a friction surface formed on said lever and a cooperating friction surface formed on an auxiliary wheel fixed to and coaxial with the pinion carried by the support structure, said auxiliary wheel having a friction surface cooperating with the said friction surface on the lever.

3. The device defined in claim 1, wherein the stop means carried on the control lever comprise a shaped surface portion formed on the control lever and urged by the resilient engagement means into engagement with the teeth of the pinion to prevent rotation of the latter.

4. The device as claimed in claim 3 wherein the shaped surface portion defines a surface recess of sufficient size to accommodate the pinion, said surface portion being provided with a plurality of projections separated by indentations in which respective teeth of the pinion engage upon engagement of said stop means with said pinion.

5. The device as claimed in claim 3, wherein the shaped surface portion defines a recess which is sufficiently wide at its entrance to receive the pinion, while becoming progressively narrower towards its bottom so as to force the teeth of the pinion against the sides of the recess.

6. The device as claimed in claim 3 wherein the shaped surface portion includes a single projecting tooth which engages between adjacent teeth of the pinion upon engagement of the pinion with the stop means.

7. The device as claimed in claim 3, wherein the shaped surface portion has a part-polygonal shape adjacent vertices of which are engageable by adjacent teeth of the pinion to prevent rotation of the latter upon its engagement by the stop means.

* * * * *